(12) United States Patent
Utsumi et al.

(10) Patent No.: US 6,962,418 B2
(45) Date of Patent: *Nov. 8, 2005

(54) PROJECTION APPARATUS PANEL ASSEMBLY

(75) Inventors: Kenichiro Utsumi, Tokyo (JP); Dai Yoneya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/086,088

(22) Filed: Mar. 21, 2005

(65) Prior Publication Data

US 2005/0162739 A1 Jul. 28, 2005

Related U.S. Application Data

(63) Continuation of application No. 10/143,073, filed on May 10, 2002, now Pat. No. 6,876,492.

(30) Foreign Application Priority Data

May 14, 2001 (JP) ............................. 2001-143994

(51) Int. Cl.[7] ...................... G03B 21/22; G03B 21/14; G03B 21/56; G03B 21/60
(52) U.S. Cl. ........................ 353/74; 353/119; 359/460; 359/456
(58) Field of Search ............................ 353/47, 50, 51, 353/72, 74, 77–80, 119, 122, 37, 75, 76; 348/787, 789, 794, 836, 840–842, 823; 359/456, 359/457, 460; 248/917, 918

(56) References Cited

U.S. PATENT DOCUMENTS

| 5,699,131 A | 12/1997 | Aoki et al. .................. 348/832 |
| 5,887,959 A * | 3/1999 | Yuri ........................... 312/7.2 |
| 6,157,416 A | 12/2000 | Whitelaw et al. ........... 348/789 |
| 6,614,594 B2 * | 9/2003 | Murasugi et al. ........... 359/450 |
| 6,848,793 B2 * | 2/2005 | Utsumi ........................ 353/74 |

OTHER PUBLICATIONS

Merriam-Webster's Collegiate dictionary—10th ed, 1993, p. 676 and 677.

* cited by examiner

Primary Examiner—Alan A. Mathews
Assistant Examiner—Andrew Sever
(74) Attorney, Agent, or Firm—Frommer Lawrence & Haug; William S. Frommer

(57) ABSTRACT

A projector 10 projects an image onto a set of screens 14 for image formation. The set of screens 14 includes a first screen 50 and second screens 54 and 56. The projector includes a housing 20, a first screen fixture 74 and a second screen fixture 76. The housing 20 has an opening 30 for fitting the first screen 50 therein. The first screen fixture 74 positions the first screen 50 in the housing opening 30 and fixes an inner surface of the first screen 50 adhesively to the housing 20. The second screen fixture 76 is positioned between the first screen 50 and the first screen fixture 74, and fixes the second screens 54 and 56 between itself and the inside of the first screen 50.

3 Claims, 12 Drawing Sheets

PRIOR ART

PRIOR ART

PROJECTION APPARATUS PANEL ASSEMBLY

This is a continuation of application Ser. No. 10/143,073, filed May 10, 2002 now U.S. Pat. No. 6,876,492, the entirety of which is incorporated herein by reference.

BACKGROUND OF THE INVENTION

1. Field of the Invention

The present invention relates to improvements in a projector for projecting an image onto a set of screens for image formation.

2. Description of the Related Art

There is known a projector for projecting an image, a picture or the like on an enlarged scale onto the backside of relatively large screens.

The projector includes an optical unit including a projection lens for enlarging an image or the like and projecting it onto the screens.

FIGS. 1 and 2 show a structure for fixing the screens of a conventional projector 2000.

The projector 2000 includes a contrast screen 2023, a lenticular screen 2005 and a fresnel screen (or lens) 2006. The screens 2023, 2005 and 2006 are fixed to a screen frame 2003 by means of a screen holder 2012 and screws 2013. The screen frame 2003 includes a front part 2020, which includes bosses 2028 protruding inward. Each screw 2013 is threaded into one of the bosses 2028 to fix the screen holder 2012 to the bosses 2028. This fixes the screens 2023, 2005 and 2006 between the inside 2032 of the front frame part 2020 and the inside 2034 of the screen holder 2012.

The front frame part 2020 extends along the four sides of the screen frame 2003 and has a width 2040, which is relatively large enough to hide the screen holder 2012, bosses 2028 and screws 2013 from a viewer M.

Consequently, the front part 2020 of the screen frame 2003 restricts the projector greatly in design.

The screens 2023, 2005 and 2006 may need to be assembled and fixed manually with the screws 2013 threaded into the screen holder 2012. The manual fixing work is troublesome, and the assembly productivity is low.

SUMMARY OF THE INVENTION

In view of the foregoing problems, the object of the present invention is to provide a projector that can be fitted simply with a set of screens, and that has no restriction in its front design.

According to a first aspect of the present invention, there is provided a projector for projecting an image onto a set of screens for image formation. The set of screens includes a first screen and a second screen. The projector includes a housing having an opening for fitting the first screen therein. The projector also includes a first screen fixture for positioning the first screen in the housing opening and fixing an inner surface of the first screen adhesively to the housing. The projector further includes a second screen fixture positioned between the first screen and the first screen fixture. The second screen fixture fixes the second screen between itself and the inside of the first screen.

Thus, the first screen fixture can fix the first screen in the housing opening adhesively to the housing. The adhesive fixation is very simple and secure or reliable, and does not need screws or the like.

The second screen fixture is positioned between the first screen and the first screen fixture, and simply fixes the second screen between itself and the inside of the first screen. Accordingly, it is possible to fix the first and second screens by means of only a pinch and adhesion without needing screws, a screen holder, etc. This improves the projector assembly productivity.

Because the first screen fixture adhesively fixes the inner surface of the first screen, it is not necessary to form a portion of the housing on the outside of the first screen to fix this screen. This allows the first screen to be large in size to fit the housing opening.

Consequently, it is possible to reduce the restrictions on the design of the projector. Because there is no need for members such as screws and a screen holder, the assembly productivity is improved.

The first screen may be a contrast screen for protecting the second screen and for improved contrast in external light.

The second screen may include a fresnel screen and a lenticular screen. The fresnel screen converts projected divergent beams into parallel beams. The lenticular screen diverges the parallel beams in the right and left directions.

The first screen fixture may include a fitting structure and a fitting member. The fitting structure protrudes from the inside of the housing. The fitting member includes a first part and a second part. The first part is fixed in engagement with the fitting structure. The second part is fixed adhesively to the inner surface of the first screen. The second screen fixture may include a first pinch part and a second pinch part. The first pinch part is connected to the fitting structure. The second pinch part is provided on the side of the fitting member that is opposite to the first screen.

The second pinch part of the second screen fixture may be the inner surface of the first screen.

According to a second aspect of the present invention, there is provided a projector for projecting an image onto a set of screens for image formation. The set of screens includes a first screen and a second screen. The projector includes a housing having an opening for fitting the first screen therein. The projector also includes a first screen fixture for positioning the first screen in the housing opening and fixing the first screen into engagement with the housing. The projector further includes a second screen fixture positioned between the first screen and the first screen fixture. The second screen fixture fixes the second screen between itself and the inside of the first screen.

Thus, the first screen fixture fixes the first screen into engagement with the housing, while the second screen fixture fixes the second screen between itself and the inside of the first screen.

The simple pinching fixation does not need a screen holder or another member and screws as used in the prior art. This improves the projector assembly productivity.

The first screen of this projector may be a contrast screen for protecting the second screen and for improved contrast in external light.

The second screen of this projector may include a fresnel screen for converting projected divergent beams into parallel beams and a lenticular screen for diverging the parallel beams in the right and left directions.

The first screen fixture of this projector may include a fitting structure and a fitting member. The fitting structure protrudes from the inside of the housing. The fitting member includes a first part and a second part. The first part is fixed in engagement with the fitting structure. The second part protrudes from the inside of the first screen. The second screen fixture may include a first pinch part and an inner surface of the first screen. The first pinch part is connected to the fitting structure.

BRIEF DESCRIPTION OF THE DRAWINGS

A preferred form of the present invention is illustrated in the accompanying drawings in which.

DETAILED DESCRIPTION OF THE PREFERRED EMBODIMENTS

Preferred embodiments of the present invention are described below in detail with reference to the accompanying drawings. Although the embodiments have technically preferred limitations, the scope of the invention is not limited to the embodiments unless it is stated herein that the invention is limited to any of them.

Figure 1:
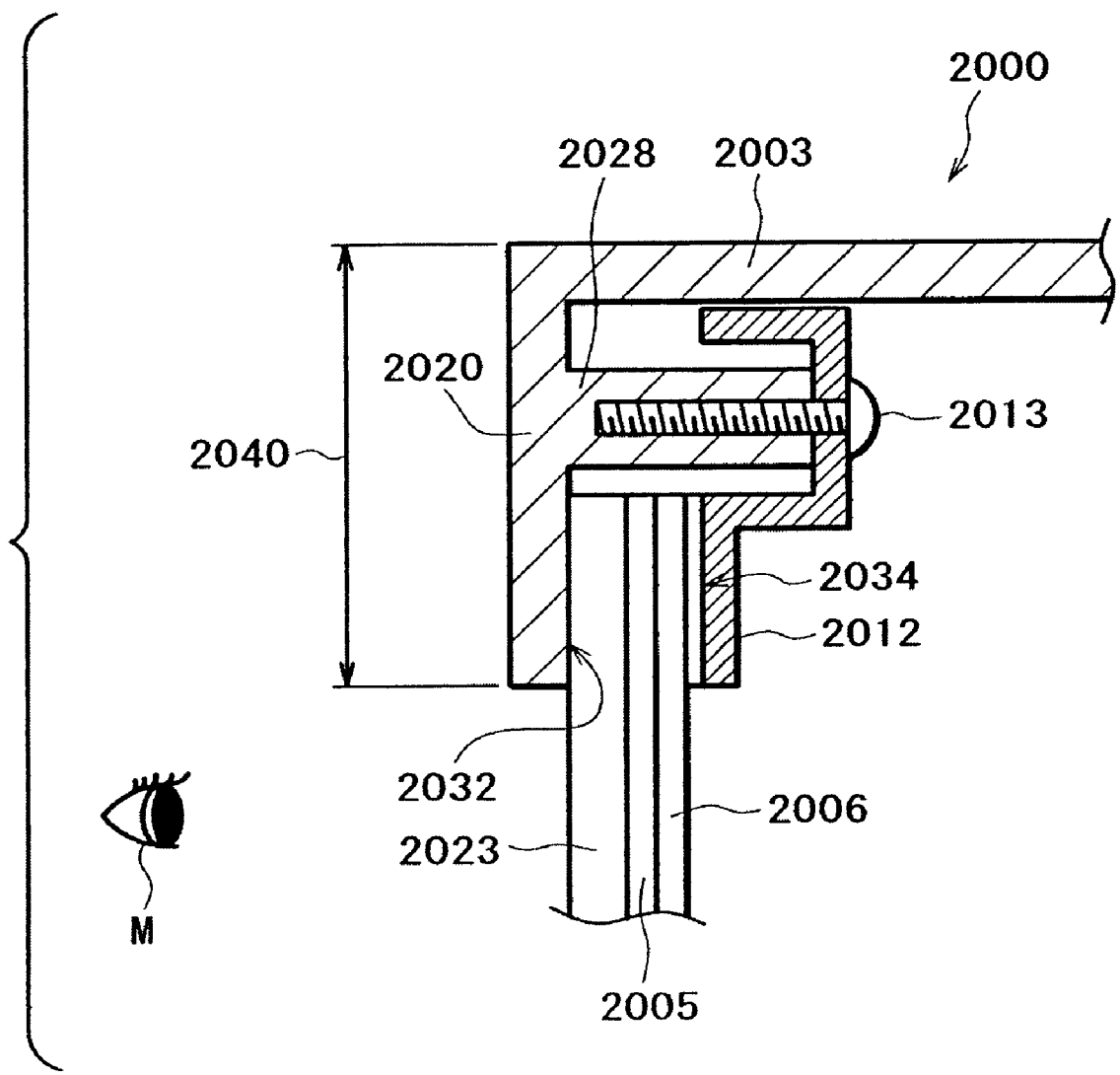
FIG. 1 is a cross section showing a structure for fitting the screens of a conventional projector.
Figure 2:
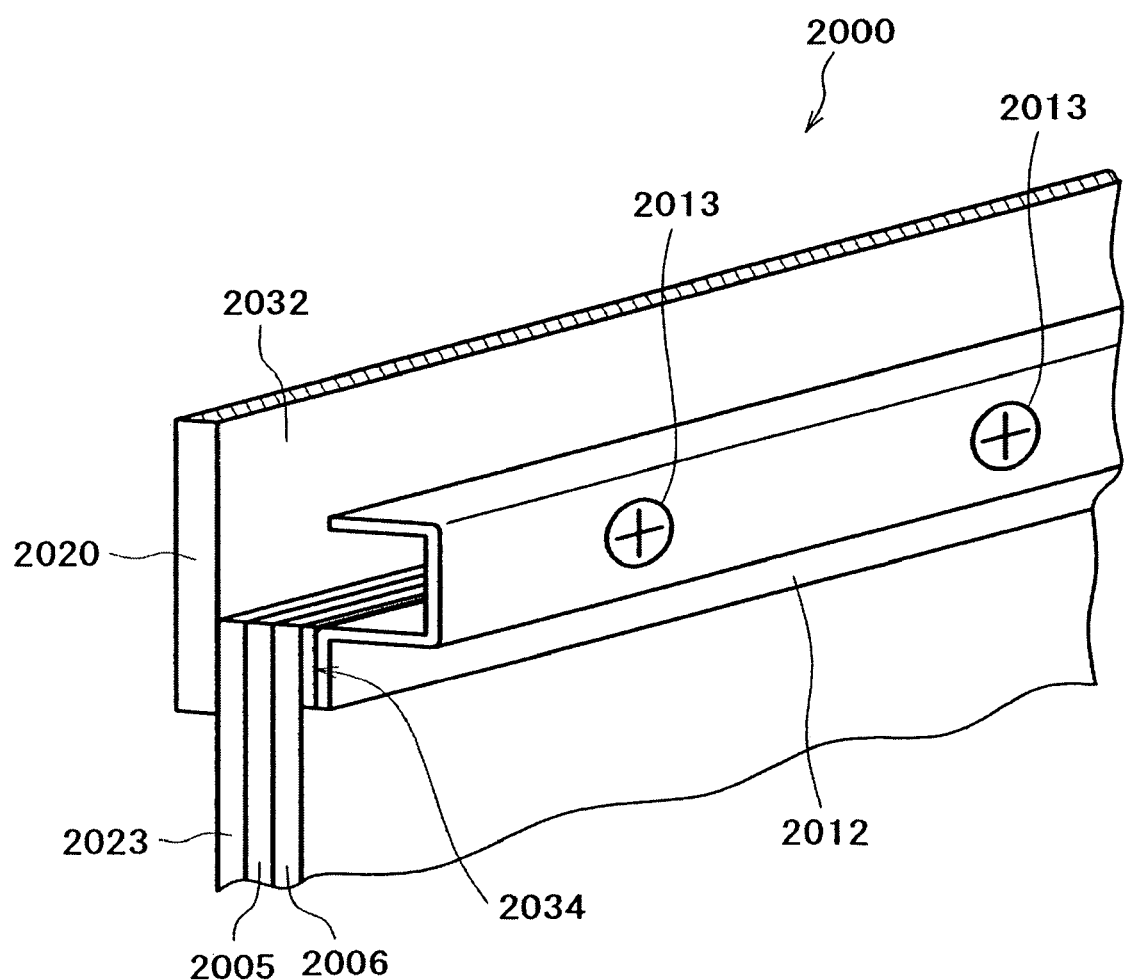
FIG. 2 is a perspective view showing the structure of FIG. 1.
Figure 3:
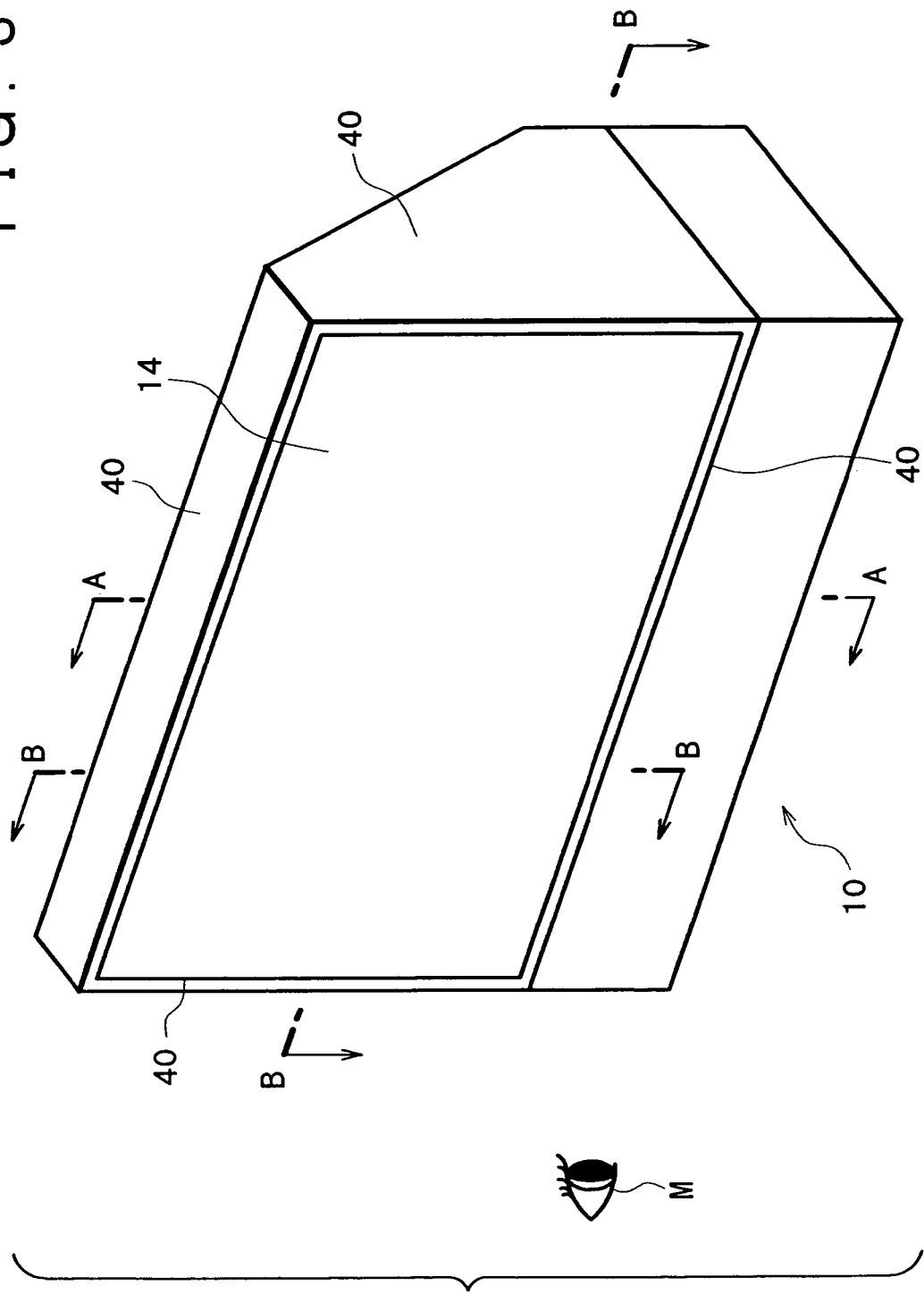
FIG. 3 is a perspective view of a projector according to a preferred embodiment of the present invention.
Figure 4:
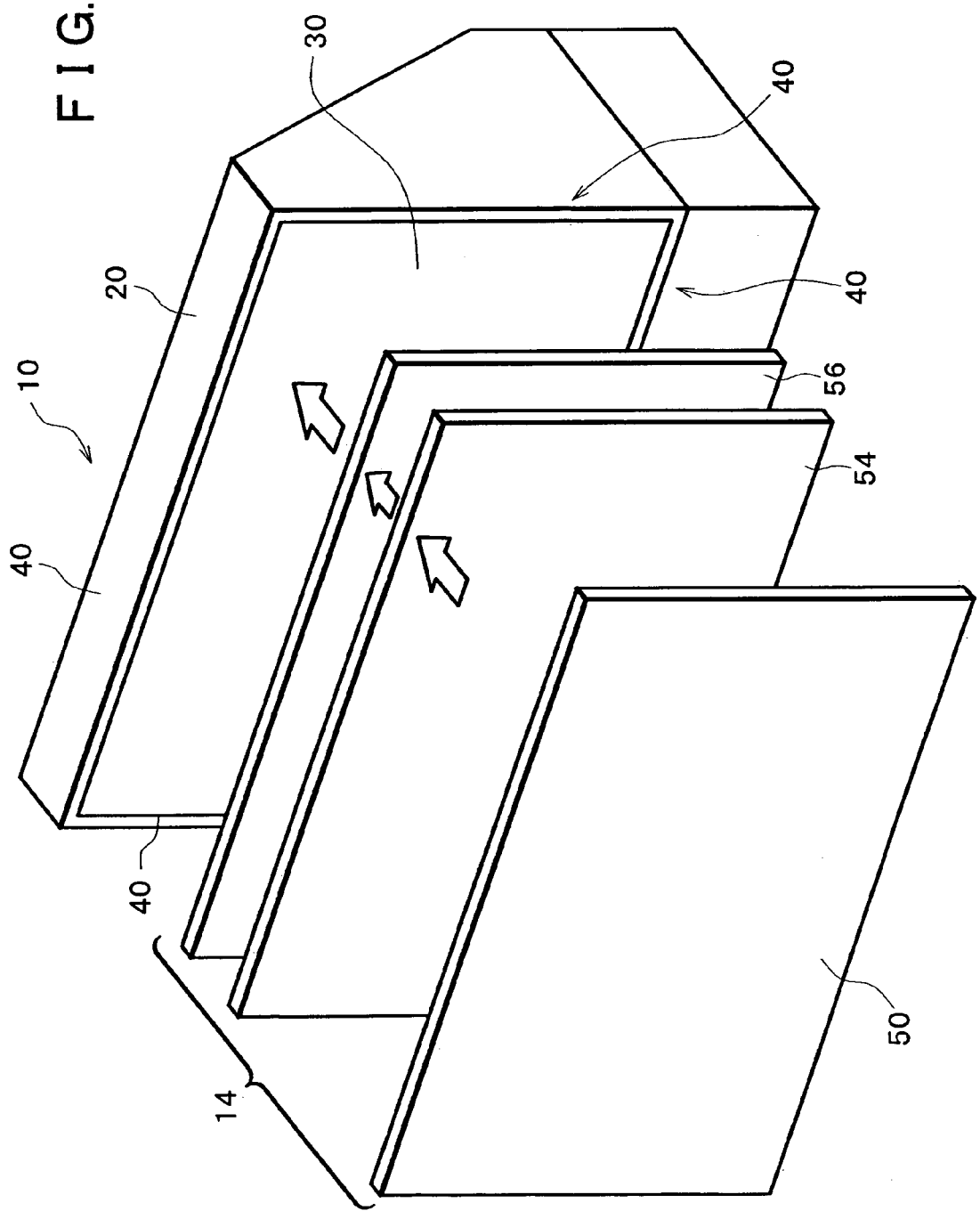
FIG. 4 is an exploded perspective view of the projector of FIG. 3, showing the screens and housing of the projector.

With reference to FIGS. 3 and 4, a projector 10 projects and displays an image or the like on the inside of a set of screens 14, which a viewer M can view.

Figure 5:
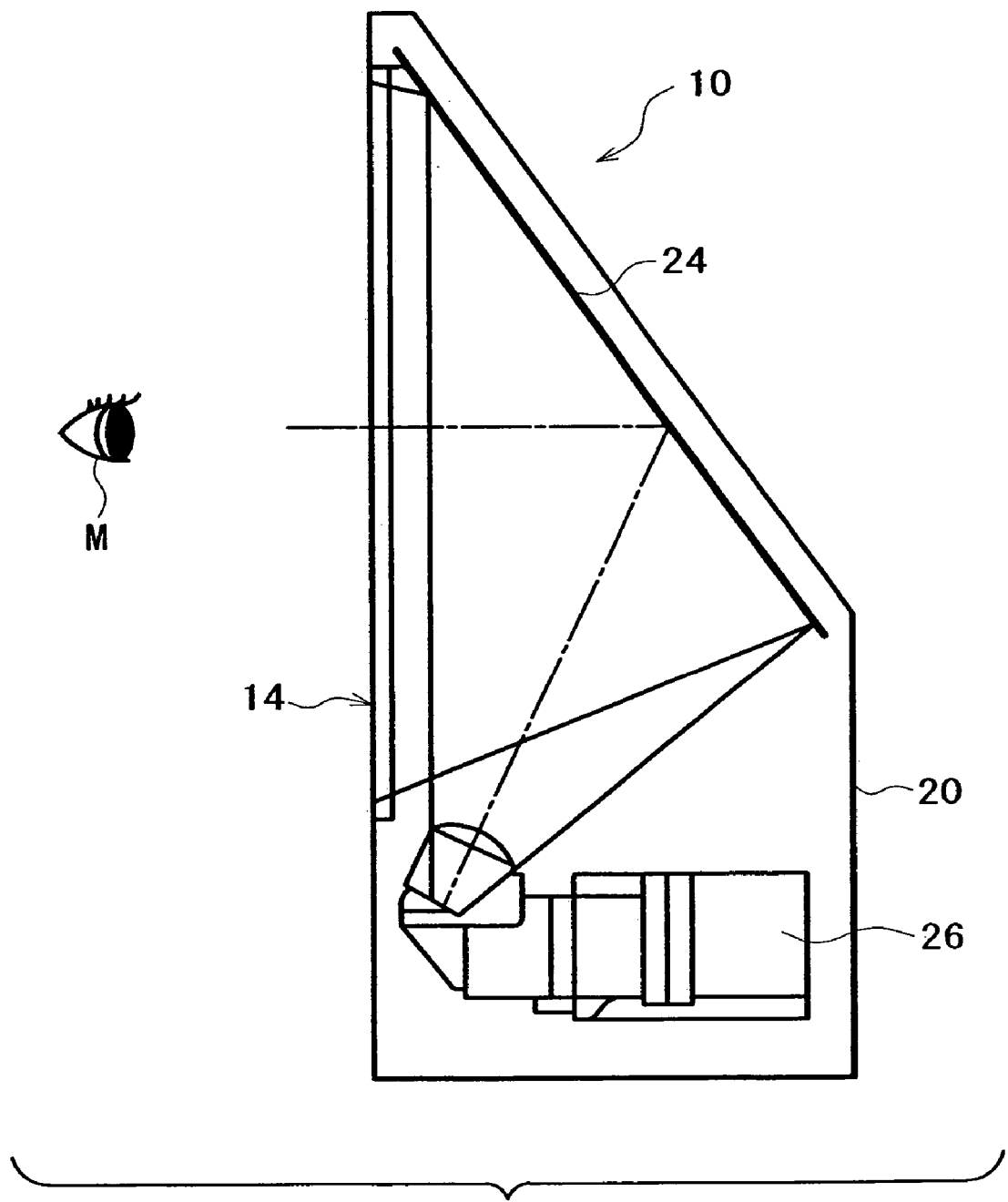
FIG. 5 is a cross section along line A—A of FIG. 3.

With reference to FIG. 5, the projector 10 includes a housing 20, which houses a reflecting mirror 24 and an optical unit 26. The optical unit 26 may include an LCD panel.

The image projected by the optical unit 26 is reflected by the reflecting mirror 24 and projected on the inside of the set of screens 14. The viewer M can view the projected image through the set of screens 14. A projector of such structure may be referred to as a rear projection television receiver.

With reference to FIG. 4, the housing 20 has an opening 30, which may be rectangular, and includes a frame 40. For the formation of the projected image, the set of screens 14 is fitted in the opening 30 and fixed to the frame 40. The frame 40 should preferably have an upper side, a lower side, a right side and a left side around the opening 30.

The set of screens 14 consists of a first screen that is a contrast screen 50 and two second screens that are a lenticular screen 54 and a fresnel screen (or lens) 56. The contrast screen 50 and fresnel screen 56 are positioned on the outside and inside respectively of the lenticular screen 54.

Figure 6:
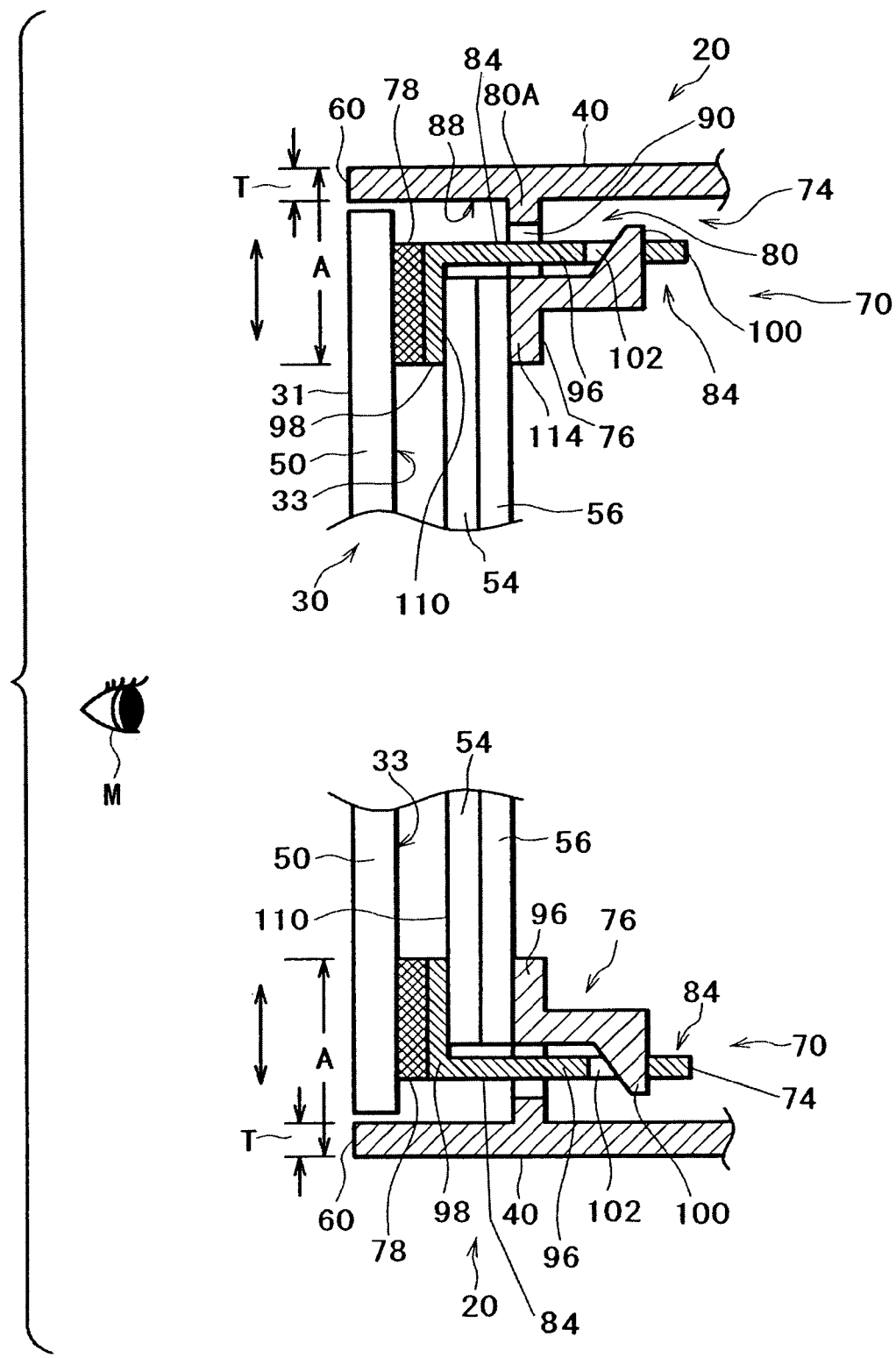
FIG. 6 is a cross section along one of lines B—B of FIG. 3, showing how the screens are fitted.

With reference to FIGS. 4 and 6, the contrast screen 50 is a front plate provided for improved contrast in external light, and for protection of the surfaces of the lenticular screen 54 etc., which face the viewer M.

The fresnel screen 56 may be formed of acryl, polycarbonate or other material. The fresnel screen 56 serves to make parallel the divergent beams of the image projected by the optical unit 26, which is shown in FIG. 5.

The lenticular screen 54 may be formed of acryl, polycarbonate or other material. The lenticular screen 54 serves to diverge the parallel beams in the right and left directions.

As shown in FIG. 6, the screens 50, 54 and 56 are fixed to the frame 40 by fixing structures 70.

With reference to FIG. 6, the frame 40 does not include a wide front portion as is included in the prior art, but the viewer M can see the front end 60 of the frame 40, which has a thickness T. Thus, the rectangular opening 30, which is surrounded by the front end 60 of the frame 40, is smaller than the outer size of the frame 40 by the thickness T, but is very large in design.

The opening 30 is filled substantially with the contrast screen 50. Preferably, the front side 31 of this screen 50 should be substantially flush with the front end 60 of the frame 40.

As shown in FIG. 6, each fixing structure 70 consists of a first screen fixture 74 and a second screen fixture 76.

With the contrast screen 50 positioned in the opening 30, the first screen fixtures 74 of the fixing structures 70 fix the inside 33 of this screen 50 with adhesive means 78 to the housing 20.

Specifically, each first screen fixture 74 includes a fitting structure 80 and a fitting member 84.

The fitting structure 80 protrudes in parallel with the contrast screen 50 from the inside 88 of the frame 40. The fitting structure 80 includes a vertical part 80A and protrusions 100. The vertical part 80A has holes 90 formed through it, each of which is adjacent to one of the protrusions 100.

Figure 7:
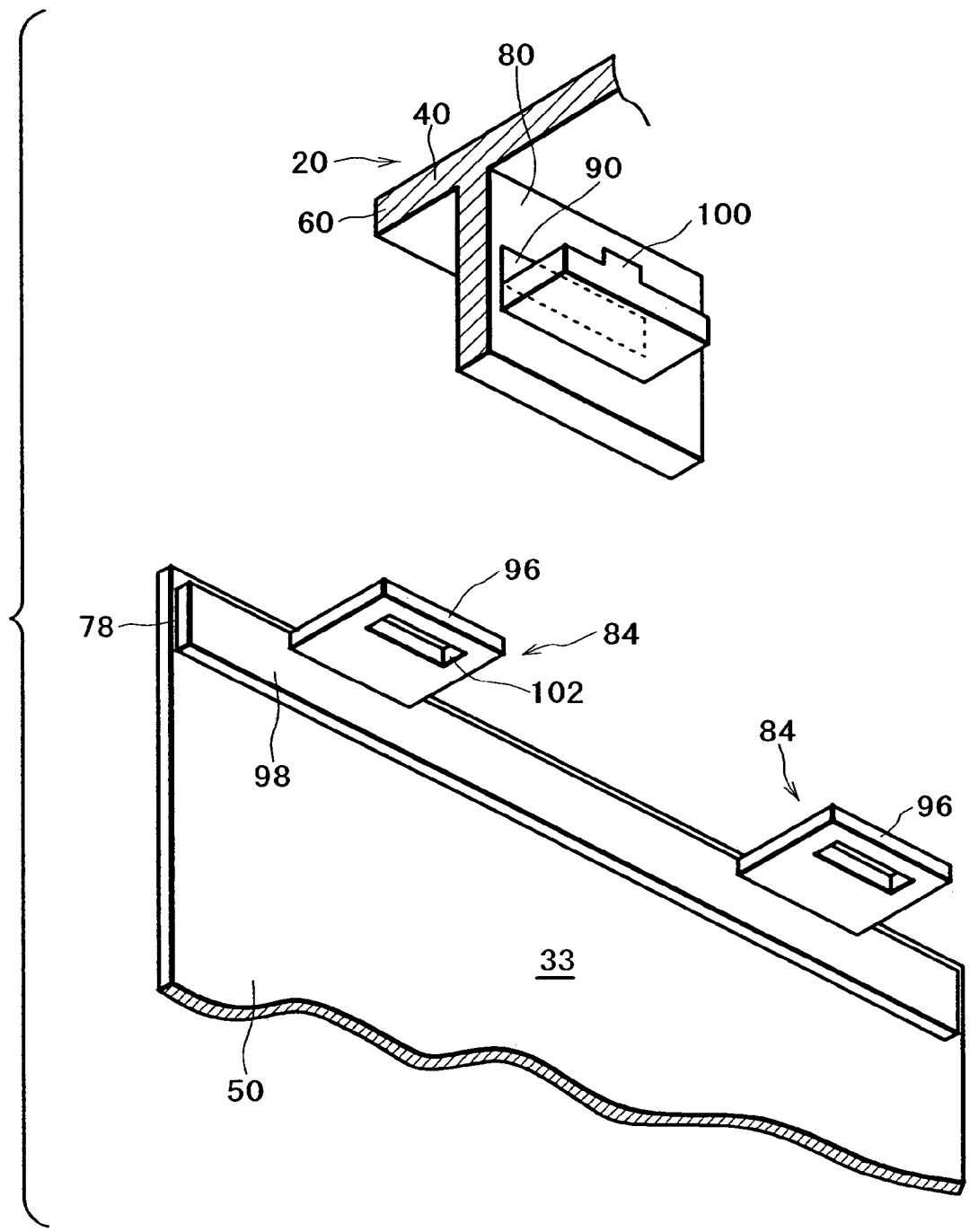
FIG. 7 is a perspective view of a fitting member and a fitting structure for fitting the contrast screen of the projector of FIGS. 3–5.

As shown in FIG. 6, the fitting member 84 is substantially L-shaped in section. As shown in FIGS. 6 and 7, the fitting member 84 includes horizontal parts 96 and a vertical part 98. As shown in FIG. 6, each horizontal part 96 extends through one of the holes 90 of the fitting structure 80. Each horizontal part 96 has a hole 102 formed through it, which engages with one of the protrusions 100 of the fitting structure 80. The fitting member 84 could alternatively be T-shaped in section.

The fitting member 84 is positioned near an edge of the contrast screen 50. The vertical part 98 of this member 84 is fixed to the inside 33 of this screen 50 adhesively by one of the adhesive means 78.

As shown in FIG. 7, the vertical part 98 of the fitting member 84 takes the form of a belt longer than the horizontal parts 96. The horizontal parts 96, which may be two in number, extend perpendicularly to the vertical part 98.

Thus, the contrast screen 50 is fixed to the housing frame 40 by the fitting structures 80 and the fitting members 84 of the first screen fixtures 74 and adhesively by the adhesive means 78. This removes the need for screws, metallic screen holders for fitting, and other members as conventionally used. It is consequently possible to fix the contrast screen 50 by means of engagement without screws, thereby greatly improving the assembly productivity.

The contrast screen 50 can substantially fill the opening 30 and accordingly be positioned within the front end 60 of the frame 40. This makes it possible to enlarge the contrast screen 50 in area as compared with the prior art. In other words, it is possible to minimize the dimension A. (FIG. 6) between an outer surface of the housing 20 and the inner edge of the adjacent adhesive means 78, making the housing 20 compact. The inner edges of all adhesive means 78 are positioned slightly outside the effective size of the contrast screen 50.

The adhesive means 78 may be double-coated tape, or a liquid, fluid or solid adhesive.

It is thus possible to fix the contrast screen 50 substantially flush in the frame opening 30 simply and securely by means of engagement and simple adhesion.

The second screen fixtures 76 of the fixing structures 70 fix the lenticular screen 54 and fresnel screen 56 extending on each other on the inside of the contrast screen 50. Each second screen fixture 76 consists of a pinch surface 110 of the vertical part 98 of the associated fitting member 84 and a pinch member 114. The pinch member 114 is integral with the associated fitting structure 80 and positioned near the holes 90. The pinch member 114 and pinch surface 110 face each other, and the screens 54 and 56 are held between them.

The thus held lenticular screen 54 and fresnel screen 56 are spaced slightly from the inside 33 of the contrast screen 50 and positioned in parallel to this screen 50.

FIGS. 8–11 show other embodiments of the present invention.

FIGS. 8–11 are similar to FIG. 6, and similar parts in them are assigned the same reference numerals to avoid repeated description.

The embodiment of FIG. 8 differs from that of FIG. 6 in the following points.

Although the fitting structures 80 of the first screen fixtures 74 are identical, the fitting members 84 of the first screen fixtures 74 are slightly different. The fitting members 84 in FIG. 8 are generally T-shaped in section, and each include horizontal parts 96 and a vertical part 98. Each horizontal part 96 has a hole 102 formed through it. The vertical part 98 is fixed with an adhesive means 78 to the inside 33 of the contrast screen 50. The fitting structure 80 has holes 90 formed through it, and each horizontal part 96 extends through one of the holes 90.

The sectionally T-shaped fitting members 84 could alternatively be L-shaped in section. The sectionally L-shaped fitting members of other embodiments could alternatively be T-shaped in section.

Figure 8:
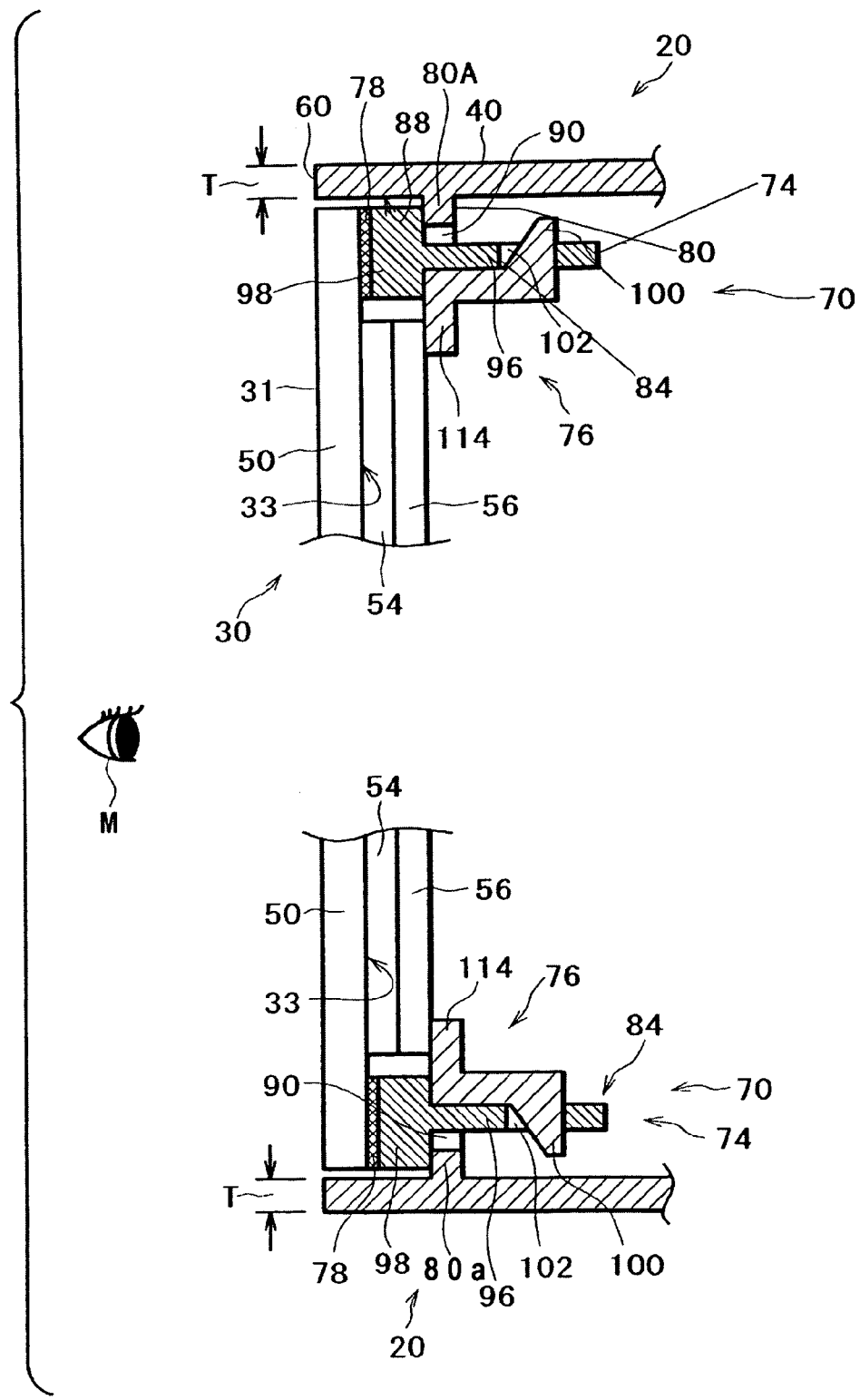
FIG. 8 is a cross section showing another embodiment of the present invention.

Each second screen fixture 76 in FIG. 8 consists of a pinch member 114 and the inside 33 of the contrast screen 50, which pinch the lenticular screen 54 and fresnel screen 56 between them. The lenticular screen 54 and fresnel screen 56 extend on each other closely on the inside of the contrast screen 50.

The embodiment of FIG. 9 differs from that of FIG. 6 in the following points.

Figure 9:
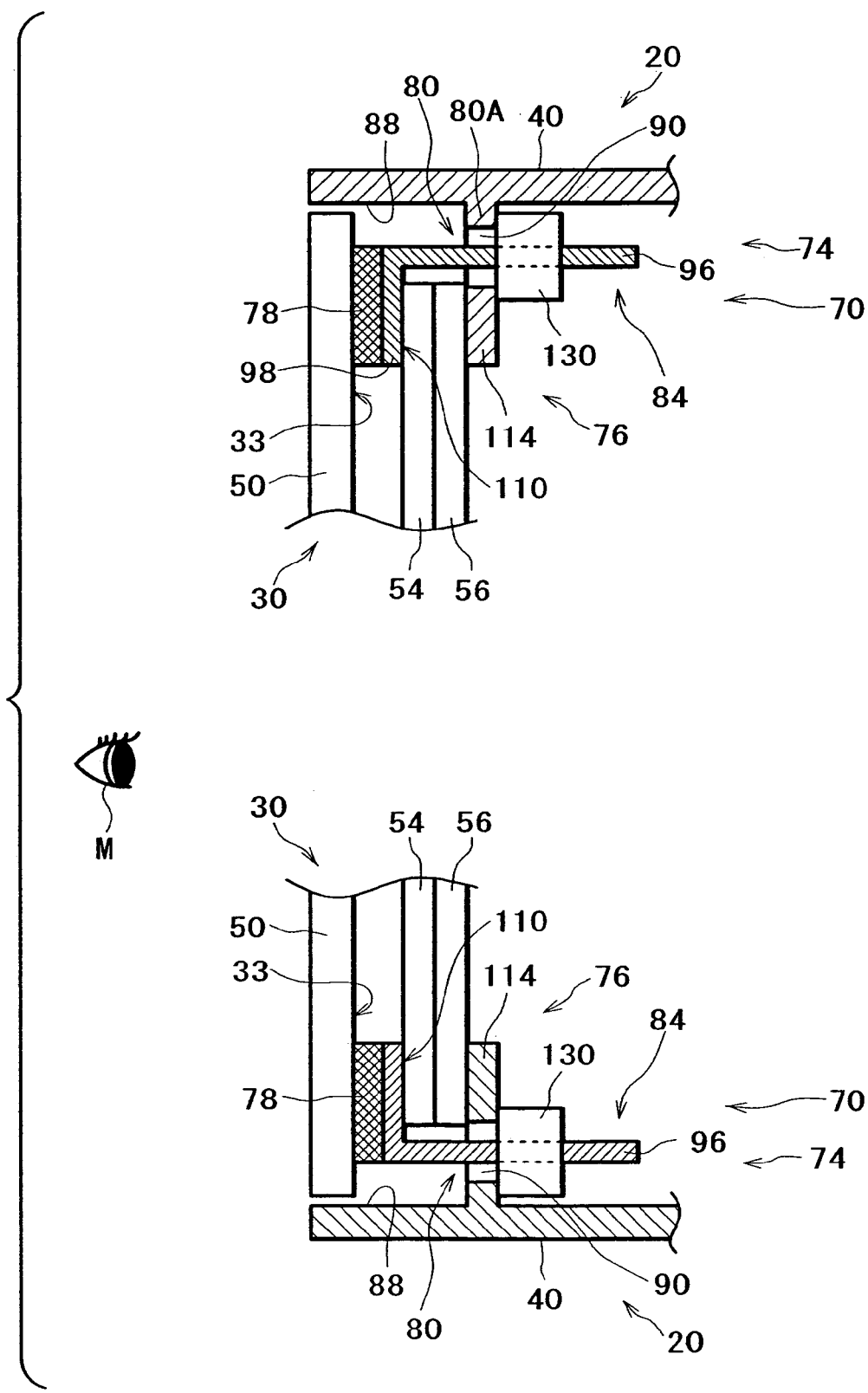
FIG. 9 is a cross section showing still another embodiment of the present invention.

Although the fitting structure 80 of each first screen fixture 74 in FIG. 9 includes a vertical part 80A and has holes 90 formed through it, it does not include protrusions 100 as shown in FIG. 6. The fitting members 84 of the first screen fixtures 74 are generally L-shaped in section. Each horizontal part 96 of the fitting member 84 extends through one of the holes 90 and is fixed on the inside of the fitting structure 80 by a stopper 130. The vertical part 98 of the fitting member 84 is fixed to the inside 33 of the contrast screen 50 adhesively by an adhesive means 78.

Each second screen fixture 76 in FIG. 9 consists of a pinch member 114 and a pinch surface 110 of the vertical part 98 of the fitting member 84. The lenticular screen 54 and fresnel screen 56 extending on each other are fixed between the pinch member 114 and pinch surface 110, and spaced from the inside 33 of the contrast screen 50.

Figure 10:
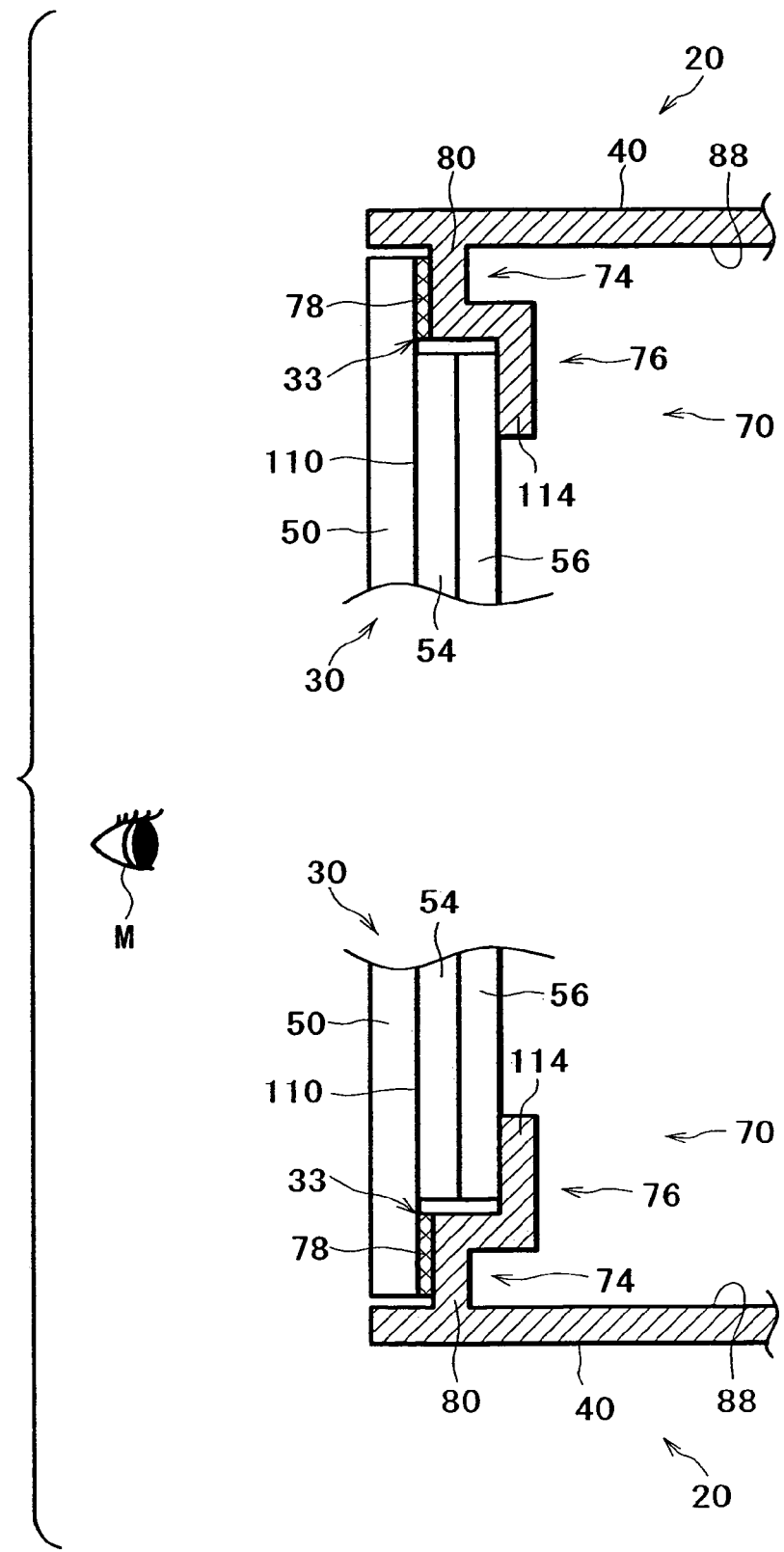
FIG. 10 is a cross section showing yet another embodiment of the present invention.

In the embodiment shown in FIG. 10, each first screen fixture 74 includes a fitting structure 80 extending integrally from an inner surface 88 of the frame 40. The fitting structure 80 functions also as a fitting member (84 in FIG. 6). The outside of the fitting structure 80 is fixed to the inside 33 of the contrast screen 50 adhesively by an adhesive means 78.

Each second screen fixture 76 of this embodiment consists of a pinch member 114 and the inside 33 of the contrast screen 50, between which the lenticular screen 54 and fresnel screen 56 are fixed. This makes the lenticular screen 54 extend closely between the contrast screen 50 and fresnel screen 56.

Figure 11:
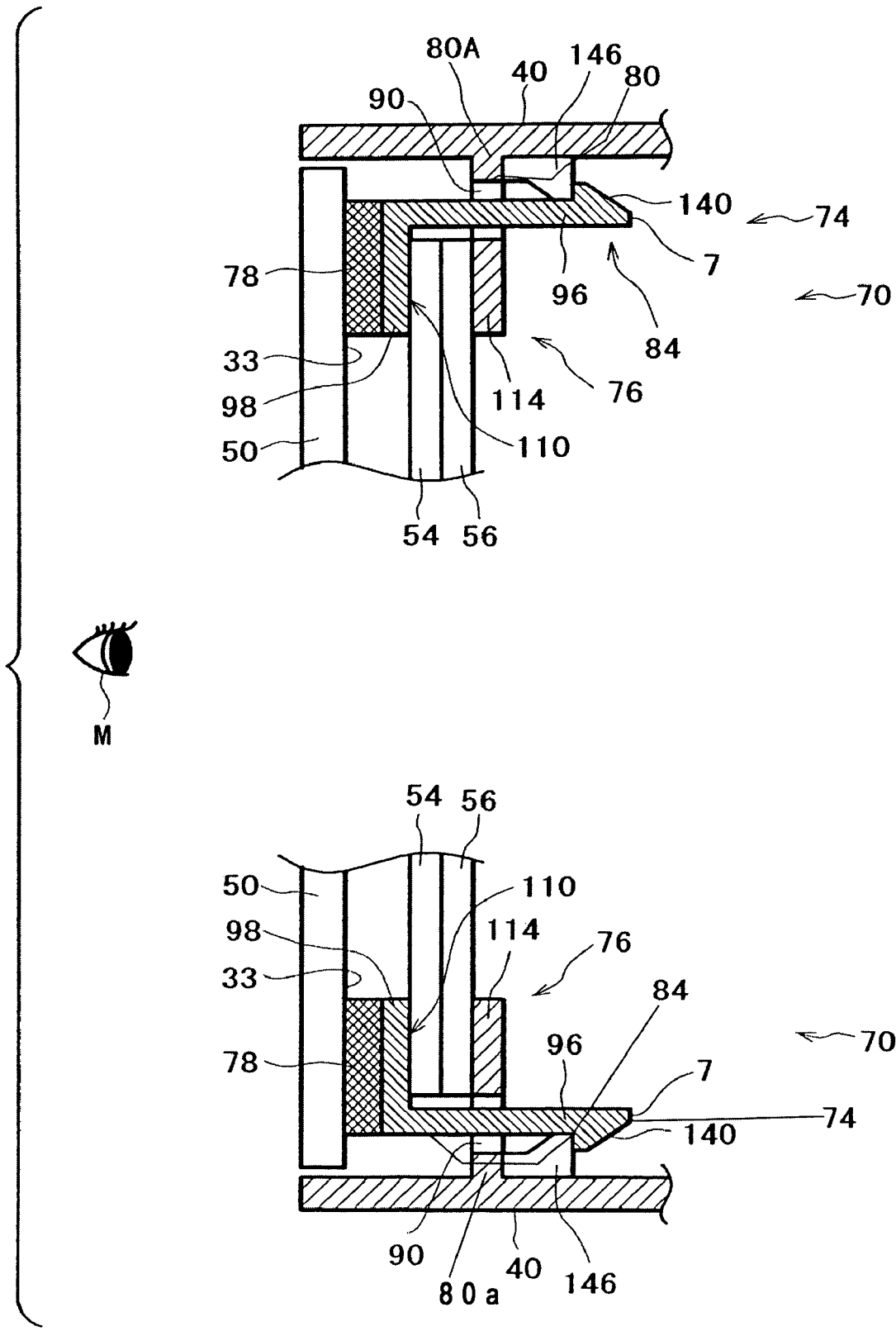
FIG. 11 is a cross section showing a further embodiment of the present invention.

In the embodiment shown in FIG. 11, each first screen fixture 74 includes a fitting structure 80 and a fitting member 84. The fitting structure 80 has holes 90 formed through it. The fitting member 84 includes horizontal parts 96 and a vertical part 98. Each horizontal part 96 extends through one of the holes 90 and includes a pawl 140. The vertical part 98 is fixed to the inside 33 of the contrast screen 50 adhesively by an adhesive means 78. The fitting structure 80 includes pawls 146 each engaging with one of the pawls 140. Thus, the fitting members 84 fix the contrast screen 50 to the frame 40.

Each second screen fixture 76 in FIG. 11 consists of a pinch member 114 and a pinch surface 110 of the vertical part 98 of the fitting member 84, between which the lenticular screen 54 and fresnel screen 56 are fixed. This spaces the lenticular screen 54 and fresnel screen 56 from the inside 33 of the contrast screen 50.

Figure 12:
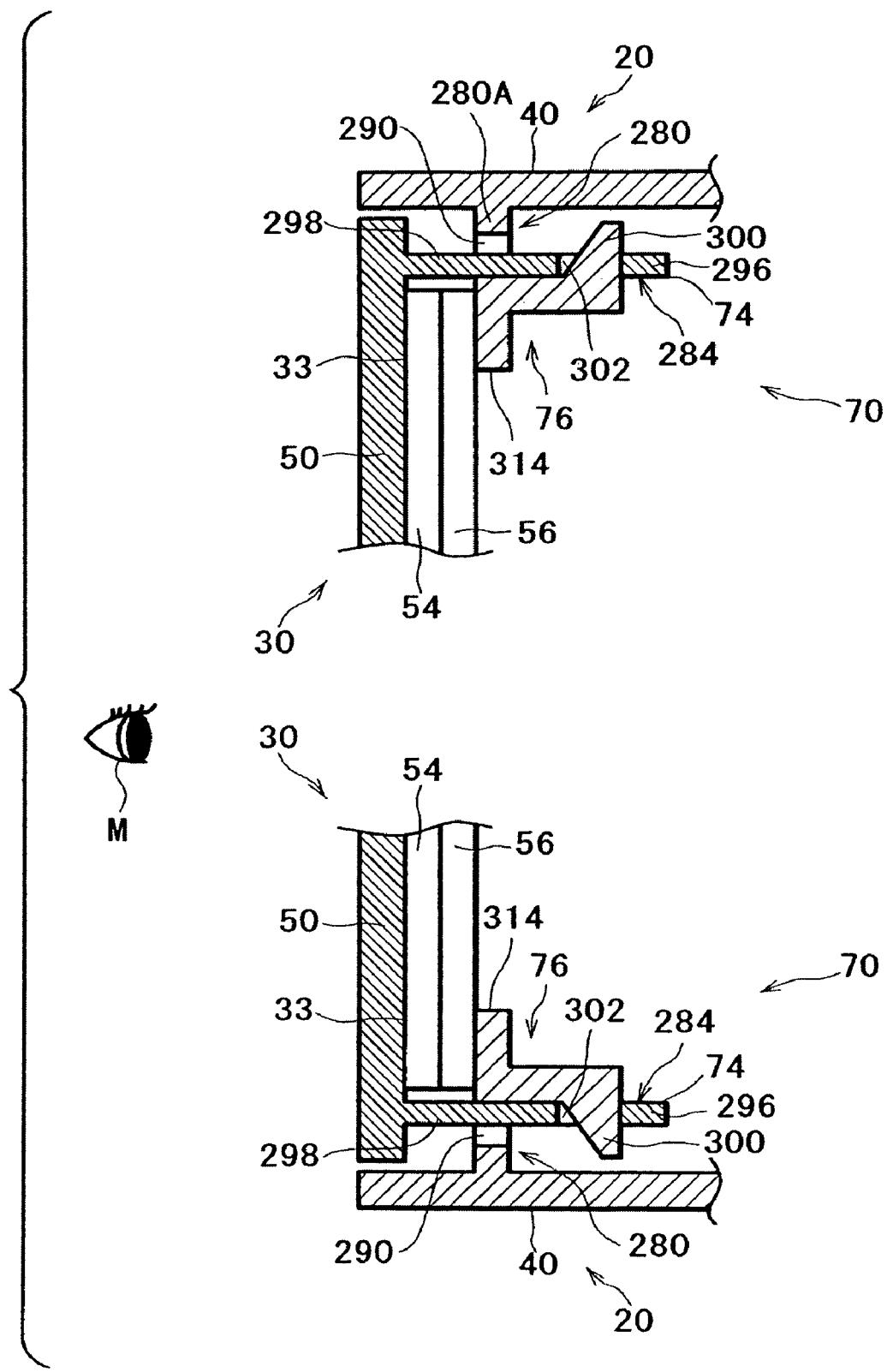
FIG. 12 is a cross section showing a still further embodiment of the present invention.

FIG. 12 shows another embodiment of the present invention.

In FIGS. 6 and 12, similar parts are assigned the same reference numerals to avoid repeated description.

In FIG. 12, each fixing structure 70 includes a first screen fixture 74 for fixing the contrast screen 50 in the opening 30 of the housing 20.

The first screen fixture 74 includes a fitting structure 280 and horizontal fitting parts 284. The fitting structure 280 includes a vertical part 280A extending from the inside of the housing frame 40 and in parallel to the contrast screen 50. The fitting structure 280 has holes 290 formed through it. Each fitting part 284 extends through one of the holes 290.

Each fitting part 284 has a hole 302 formed through it. The fitting structure 280 includes protrusions 300, each of which engages with one of the holes 302 of the fitting parts 284.

This embodiment is characterized by the fitting parts 284 extending directly from the inside 33 of the contrast screen 50 inward of the housing 20 and in parallel to the frame 40. The fitting parts 284 are integral with the contrast screen 50, which is fixed by the fitting structures 280 and parts 284 of the first screen fixtures 74 by means of engagement without an adhesive. The fitting parts 284 could alternatively not be parallel to the frame 40.

Each second screen fixture 76 of this embodiment consists of a pinch member 314, which is integral with the associated fitting structure 280, and the inside 33 of the contrast screen 50. The lenticular screen 54 and fresnel screen 56 are fixed between the inside 33 of the contrast screen 50 and the pinch member 314. Accordingly, the three screens 50, 54 and 56 are positioned closely in parallel.

In each embodiment, as described above, it is possible to fix the three screens 50, 54 and 56 in the opening 30 of the housing 20 simply and securely without specially providing metal parts, such as screws and a screen holder, and threading the screws. This greatly improves the assembly productivity of the screens.

Because there is no need for screws and a screen holder, it is possible to reduce the number of parts.

As shown in FIG. 6, for example, the four sides of the contrast screen 50 can be adjacent to the front end 60 of the frame 40. This enables the contrast screen 50 to substantially fill the opening 30 of the frame 40. In other words, it is possible to minimize the dimension A (FIG. 6) in comparison with the prior art. Because the contrast screen 50 is transparent, its portions for the dimension A need to be colored by printing or the like so as to hide the adhesive means 78, first screen fixture 74 and second screen fixture 76. Because the dimension A can be small, the printed area of the contrast screen 50 can be small. It is accordingly possible to fix the contrast screen 50 etc. without using a front frame part as included in the housing of the prior art. This reduces the restrictions on the design of the projector.

The present invention is not limited to the foregoing embodiments.

In each embodiment, the screen fixing structures may be provided at not only the top and the bottom but also the right and left sides of the housing frame. The first and second screen fixtures may be provided at only the top and the bottom or only the right and left sides of the housing frame.

As described hereinbefore, the present invention is a projector that can be fitted simply with screens, and that has no restriction in its front design.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A projector for projecting an image onto a set of screens for image formation, the set of screens including a first screen and a second screen, the projector comprising:

a housing having an opening for fitting the first screen therein;

a first screen fixture for positioning the first screen in the housing opening and fixing an inner surface of the first screen adhesively to the housing, said adhesive connection between said first screen and said housing being the sole means for fixing said screen to the housing, the first screen fixture comprises a fitting structure and a fitting member, the fitting structure protruding from inside of the housing, the fitting member including a first part and a second part the first part fixed in engagement with the fitting structure, the second part fixed adhesively to the inner surface of the first screen; and a second screen fixture positioned behind the first screen and the first screen fixture and having a portion thereof held within an opening in said first screen fixture for fixing the second screen between the second screen fixture and the inside of the first screen, the second screen fixture comprises a first pinch part and a second pinch part, the first pinch part connected to the fitting structure, the second pinch part provided on the side of the fitting member that is opposite to the first screen;

wherein said first screen is larger than said second screen.

2. A projector according to claim 1, wherein the first screen is a contrast screen for protecting the second screen and for improved contrast in external light.

3. A projector according to claim 2, wherein the second screen comprises:

a fresnel screen for converting projected divergent beams into parallel beams and a lenticular screen for diverging the parallel beams in the right and left directions.

* * * * *